United States Patent Office 3,269,924
Patented August 30, 1966

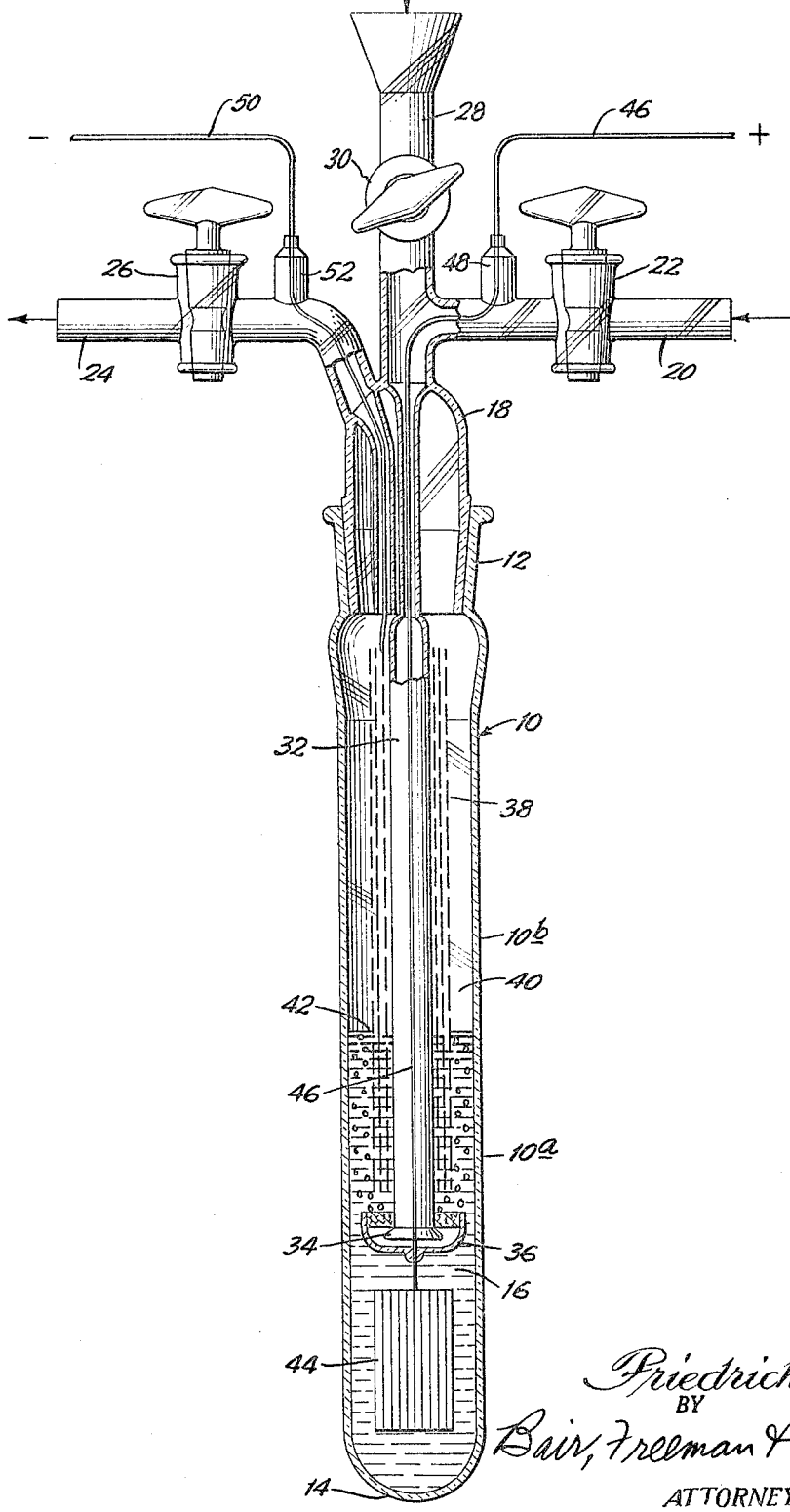

3,269,924
GALVANIC CELL AND METHOD FOR MEASURING OXYGEN TRACES IN GASES
Friedrich Nessler, Wiesbaden, Germany, assignor to Hans J. Zimmer Verfahrenstechnik, Frankfurt am Main, Germany
Filed Mar. 16, 1961, Ser. No. 96,281
4 Claims. (Cl. 204—1)

This invention relates to a highly sensitive galvanic cell for measuring oxygen traces in gases, and to a new and improved method which may be performed with the cell.

It is known to use a galvanic measuring cell to measure oxygen in gases or liquids. Such a cell, generally, consists of a non-precious metal electrode and a more precious metal electrode, which are submerged entirely or partially in the electrolyte. When measuring oxygen residues in gases, the gas is passed through the measuring cell. If the gas contains oxygen, the more precious metal cathode is depolarized. The resulting depolarization current in the outside circuit is measured by a suitable instrument, for example, a galvanometer. The current intensity is a measure of the oxygen concentration in the gas.

A number of instruments and arrangements have been proposed, which are based on this principle. A distinction must be made between measuring oxygen dissolved in liquids and measuring oxygen traces in gases. The instruments for measuring oxygen in liquids are equipped with electrodes which are completely submerged in the liquid. No gas introduction is required. On the other hand, the present invention relates to measurement of oxygen traces in gases, and employs a so-called gas electrode.

According to a proposal of Hersch (United States Patent No. 2,805,191) for measuring oxygen traces in gases, a horizontal arrangement of the measuring cell is provided. The anode is totally submerged, whereas the cathode as a sheet-metal strip, having several pleats, is only partly immersed in the electrolyte. The gas to be analyzed is led over the liquid surface of the electrolyte. The disadvantage of this measuring cell is that oxygen variations are indicated very slowly, so that this cell cannot be used for continuous measurings. Also the current output per part per million (p.p.m.) oxygen is very low, so that the instrument cannot be employed for sensitive measurings.

Another proposal of Hersch employs the so-called dry cell. The anode is wound around a gas introduction tube. The anode is surrounded by a porous material, impregnated with electrolyte liquid. The porous material is surrounded by the cathode, which is a wire gauze. In this cell, the amount of electrolyte liquid is a function of the porosity and/or absorbability of the carrier material. While this measuring cell produces a greater current intensity per oxygen unit compared with the above described system, and quickly indicates variations in the oxygen content of the gas being analyzed, it has a number of disadvantages. The constancy of the readings is insufficient, i.e., at least one re-calibration per day becomes necessary, and analysis must be interrupted. Another disadvantage is the short life of the measuring cell, which is due to the small amount of electrolyte. By the dissolution of the anode material, which takes place at the anode, the small amount of electrolyte, detained by the porous material by absorption, is quickly saturated by metal ions. Metal hydroxides soon separate, so that the measuring cell can no longer be used and must be exchanged. Also, continuous measurings cannot be made with this system.

Another measuring cell was proposed by Todt and Teske [1]. Both electrodes are located side by side and are totally submerged in a comparatively large quantity of electrolyte liquid. The gas to be analyzed is introduced into the electrolyte liquid, wherein the oxygen is dissolved corresponding to its partial pressure. This dissolved portion provides the measurement. Therefore, the manner of measuring oxygen traces in gases returns to the measurement of oxygen in liquids. The disadvantage of this instrument is the small current output per oxygen unit. This impairs the accuracy of measurement, so that intermediate values and concentrations below 1 p.p.m. can no longer be read on the usual micro-ammeter.

The important requirements, especially for industrial purposes, are for an instrument capable of continuously measuring oxygen traces, which has a long life combined with proper constancy of the readings. This previously would require a comparatively large volume of electrolyte, which would accommodate the dissolving salts from the anode without causing separations. A large volume of electrolyte, however, delays the speed of indication, and above all requires a long fade-out time because of the fact that the distribution equilibrium in the gas and in the liquid first has to adapt itself to the variations of oxygen concentration before obtaining constant measuring values. Thus it would appear that the two requirements, i.e., long life time and high indication speed with short fade-out time cannot be obtained simultaneously.

The present invention is directed especially to the measurement of the smallest oxygen traces in gases, in the range of from 0 to 5 p.p.m. $O_2$, with reading accuracies of 0.1 p.p.m. with direct connection to a micro-ammeter. Consequently, an additional requirement is a high current output per part of $O_2$-content. This requirement can best be met by a so-called gas electrode. The constancy of the readings in a gas electrode depends on the constancy of the three-phase limit, formed at the cathode by the contact line of the cathode with the electrolyte and/or the gas space. To maintain this limit constant, it would ordinarily be necessary that the volume of the electrolyte not vary over long use. However, a variation of volume over a period of use cannot be avoided, because the water vapor partial pressure of the gas to be analyzed always differs from the partial pressure existing above the electrolyte liquid. The consequence is that dry gas absorbs water from the electrolyte and thus gradually concentrates the electrolyte, so that its volume is reduced. This, in turn, displaces the three-phase limit responsible for the constancy of the measuring values. Conversely, humid gases transfer water to the electrolyte, so that its volume is increased and its concentration reduced, again resulting in a displacement of the three-phase limit.

Important objects of the invention therefore include the provision of a galvanic cell having a gas electrode for measuring oxygen traces in gases, and a method for measuring oxygen traces in gases, which overcome prior disadvantages and provide significant improvements.

A particular object is to provide a cell which is well suited to continuous measurements, and especially, which furnishes a rapid indication of variations in oxygen content.

Another object is to provide a cell having a long life,

---

[1] Fritz Toedt: Elektrochemische Sauerstoffmessungen, 1958, page 130ff. Publishers: Walter deGruyter & Co., Berlin, Germany.

and which gives constant readings without the necessity for re-calibration.

An additional object is to provide a cell which produces a high current output per part per million of oxygen, for sensitive measurement.

A further object is to provide a cell which is independent of the quantity of electrolyte therein, and is not affected by variations in the electrolyte over a period of use.

These and other objects, advantages and functions of the invention will be apparent on reference to the specification and to the attached drawing, which is a vertical sectional and elevational view of a preferred embodiment of the galvanic cell of the invention.

In the invention, a galvanic cell is provided which includes a hollow cell body, a cathode extending upwardly in the body, an anode in the body, and means for introducing a gas to the cathode from below, and above the anode.

In the new method for measuring oxygen traces in a gas, in a galvanic cell, the gas is introduced to the cathode from below. The gas is introduced above the anode, whereby the gas is maintained out of contact with the anode.

Referring to the drawing, the galvanic cell includes a tubular body 10 of glass, plexiglass, or other suitable material, which is vertically arranged and is provided with an internally ground neck 12 at its upper end. The body is closed at its base 14, and is thus adapted to contain an electrolyte 16. The electrolyte may be a solution of an acid, base or salt. A potassium hydroxide solution is exemplary.

A ground hollow head 18 is inserted into the neck 12 of the body. The head is connected to a tubular gas supply conduit 20, which is opened and closed by valve means such as a stopcock 22. A tubular gas outlet conduit 24 is connected to the head, and it is provided with a stopcock 26. A liquid supply conduit 28 is also connected to the head, for replenishing the electrolyte, and it is provided with a stopcock 30.

The gas supply conduit 20 is connected to a gas inlet tube 32 which extends upwardly in the body 10 and is coaxial therewith. The gas inlet tube terminates in an open end 34, for introducing the gas into the electrolyte 16. A fritted glass distribution head 36 is mounted on the gas inlet tube 32 at its lower end, around the tube opening, for event distribution of fine gas bubbles around the inlet tube. The distribution head is arranged centrally and spaced inwardly from the wall of the cell body 10, to provide communication of the electrolyte between the portions thereof above and below the head. A cathode 38 of precious metal, such as gold or silver, is provided in the form of a foraminous sheet or wire screen or gauze, which is wound around the gas inlet tube 32 several times. The cathode is elongated and has a constant circumference along its length, that is, it is cylindrical. The cathode is mounted adjacent to and directly over the distribution head 36, so that the gas is introduced to the cathode from below and uniformly therearound.

The cell body 10 includes an electrolyte chamber 10a and a superimposed gas chamber 10b. The cathode 38 is partly immersed in the electrolyte 16 and extends into a gas space 40 in the gas chamber 10b. A line of contact 42 is formed at the junction of the gas-liquid interface with the cathode 38, which is a circular line around the circumference of the cathode.

An anode 44 of non-precious metal such as lead, antimony or cadimum, is mounted in the cell body 10 below the distribution head 36. The gas distribution from the head 36 takes place above the anode.

The anode 44 is connected to an electrical conductor 46 which extends through the gas inlet tube 32 and out of the head 18 of the cell through a fitting 48. The cathode 38 is electrically connected to a conductor 50 which extends out of the head 18 through a fitting 52.

The gas outlet conduit 24 communicates with the gas space 40 in the cell. The liquid supply conduit 28 is connected to the gas inlet tube 32.

The foregoing construction differs from the dry cell of Hersch in that in the former, no porous material is used for absorption of the electrolyte, and the anode is arranged below the cathode in the cell. The invention is especially characterized by the introduction of the gas below the cathode 38 in such a manner that the cathode is surrounded by rising bubbles, but no bubbles reach the anode 44. A very high current output per part of oxygen is achieved in this manner. If the gas bubbles were to reach the anode, the current would decrease shortly.

The electrolyte in the chamber 10a is thus subdivided into two superimposed portions. The upper portion surrounds the cathode 38 and is filled with the rising gas bubbles. The lower portion surrounds the anode 44 and is free of gas bubbles. At the same time, the electrolyte portions communicate in the space between the distribution head 36 and the wall of the cell body 10.

An additional advantage is provided in that the metal ions dissolved at the anode 44 remain in the bottom portion of the electrolyte 16. They do not reach the cathode 38, where they would reduce the current output by secondary reactions and result in varying readings.

The design of the cell 10 and particularly the cathode 38 is especially adapted for maintaining a constant line of contact 42. This line remains the same when the upper surface level of the electrolyte moves up and down, owing to the constant circumference of the cathode.

In the case of a galvanic cell constructed as described above, wherein the diameter of the cell body 10 was 30 mm. and the length of the body was about 200 mm., with direct connection to a micro-ammeter having about 100 ohms resistance, a current output of 16 to 20 microamperes per 1 part per million of oxygen was obtained. The cell was usable in day and night shifts for uninterrupted and continuous measurement of oxygen traces in gases without necessity for re-calibration. Oxygen values less than 1 p.p.m., as well as intermediate values, were readable on the dial without difficulty.

It will be apparent that various changes and modifications can be made in the construction and arrangement of the apparatus and in the manner of operation, within the spirit and scope of the invention. It is intended that such changes and modifications be included within the scope of the appointed claims.

What I claim as new and desire to secure by Letters Patent of the United States is:

1. In a method for measuring oxygen traces in a gas, in a galvanic cell including a liquid electrolyte, a gas chamber thereabove, a partly immersed cathode, and a completely immersed anode, the improvement which comprises introducing the gas into the electrolyte below the cathode and above the anode, whereby said gas is maintained out of contact with said anode and rises through said electrolyte past said cathode, and maintaining at substantially constant length, despite changes in electrolyte level, the line of contact at which the electrolyte, the gas phase, and the cathode meet.

2. A galvanic cell for measuring oxygen traces in a gas, which comprises a tubular cell body, a liquid electrolyte in said body, a gas chamber in said body above said electrolyte, a vertical gas inlet tube arranged centrally of said body and having an opening at its lower end beneath the liquid level of said electrolyte, a tubular cathode having a constant circumference in said body and surrounding said inlet tube, said cathode being partly immersed in said electrolyte and extending into said gas chamber, a gas distribution head mounted adjacent said inlet tube opening to disperse gas from said tube around said cathode, and an anode completely immersed in said electrolyte below said distribution head.

3. A galvanic cell for measuring oxygen traces in a gas which comprises a vertically disposed tubular body containing a liquid electrolyte phase and a gas phase thereabove, a gas inlet tube extending upwardly in said body and having an outlet opening in its lower end, which lower end is submerged in said liquid electrolyte, a tubular precious metal cathode in said body surrounding said inlet tube and having its lower portion submerged in said liquid electrolyte phase above said outlet opening and its upper portion extending into said gas phase, thereby providing a line of contact between the cathode and the electrolyte at the electrolyte-gas interface, and an anode disposed in said body a sufficient distance below said outlet opening so that oxygen containing gas entering said electrolyte through said inlet tube rises upwardly around said cathode without contacting said anode.

4. The cell of claim 3 in which said cathode consists of several tubular convolutions surrounding said inlet tube to provide an extended line of contact.

References Cited by the Examiner

UNITED STATES PATENTS

| | | | |
|---|---|---|---|
| 2,414,411 | 1/1947 | Marks | 204—1 |
| 2,651,612 | 9/1953 | Haller | 204—195 |
| 2,805,191 | 9/1957 | Hersch | 204—1 |
| 2,898,282 | 8/1959 | Flook et al. | 204—195 |
| 2,939,827 | 6/1960 | Jacobson et al. | 204—195 |
| 2,943,028 | 6/1960 | Thayer | 204—1 |
| 3,028,317 | 4/1962 | Wilson et al. | 204—1 |
| 3,103,481 | 9/1963 | Robinson | 204—1 |

FOREIGN PATENTS

| | | |
|---|---|---|
| 1,219,596 | 12/1959 | France. |
| 741,368 | 11/1943 | Germany. |
| 631,403 | 11/1949 | Great Britain. |

JOHN H. MACK, *Primary Examiner.*

JOHN R. SPECK, MURRAY TILLMAN, *Examiners.*

T. TUNG, *Assistant Examiner.*